United States Patent
Futter (10) Patent No.: US 8,520,837 B2
(45) Date of Patent: Aug. 27, 2013

(54) MOBILE DEVICE DISPLAY IMPLEMENTATION

(75) Inventor: Paul Futter, Cary, NC (US)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 1159 days.

(21) Appl. No.: 12/192,722

(22) Filed: Aug. 15, 2008

(65) Prior Publication Data
US 2010/0039372 A1  Feb. 18, 2010

(51) Int. Cl.
*H04M 1/00* (2006.01)
(52) U.S. Cl.
USPC .............. 379/433.12; 385/36; 345/1.3
(58) Field of Classification Search
USPC ... 345/1.1–3.4, 156–184; 361/679.21–679.3; 455/73–129; 385/15–52; 379/428.01–440, 379/433.12–433.13
See application file for complete search history.

(56) References Cited

U.S. PATENT DOCUMENTS

| | | | | |
|---|---|---|---|---|
| 7,899,332 B2* | 3/2011 | Shindou et al. | | 398/114 |
| 2006/0198513 A1* | 9/2006 | Eldon | | 379/433.13 |
| 2006/0229115 A1* | 10/2006 | Puranen | | 455/575.1 |
| 2007/0153457 A1* | 7/2007 | Hosoya et al. | | 361/681 |

FOREIGN PATENT DOCUMENTS

| | | | |
|---|---|---|---|
| WO | WO 2006/092682 A1 | 9/2006 | |
| WO | WO 2007/113604 A1 | 10/2007 | |
| WO | WO 2008/094263 A1 | 8/2008 | |

OTHER PUBLICATIONS

International Preliminary Report on Patentability dated Nov. 24, 2010 issued in corresponding PCT application No. PCT/US2009/042828, 11 pages.
International Search Report dated Jul. 30, 2009 issued in corresponding PCT application No. PCT/US2009/042828, 12 pages.

* cited by examiner

*Primary Examiner* — Liliana Cerullo
(74) *Attorney, Agent, or Firm* — Snyder, Clark, Lesch & Chung, LLP (57) ABSTRACT

A mobile communication device contains a plurality of displays. A control module and one of the displays is contained by a first housing. Another housing, bearing a second display, is slidably engageable with the first housing. An optical data transmission mechanism is coupled between the control module and the second display. Data generated by the control module can be converted to optical signals and transmitted through the optical transmission path for control of the second display.

18 Claims, 6 Drawing Sheets

MOBILE DEVICE DISPLAY IMPLEMENTATION

FIELD OF THE INVENTION

The present invention relates to mobile communication devices, more particularly to display implementation in such devices.

BACKGROUND

Mobile communication devices, such as cellular phones and the like, have become increasingly prevalent. These devices provide the convenience of a handheld communication device with increased functionality. An expanding variety of additional features have become available, for example, short or multimedia messaging, multimedia playback, electronic mail, audio-video capturing, interactive gaming, data manipulation, web browsing, and the like. Other enhancements, such as, location-awareness features, e.g., global position system (GPS) tracking, enable mobile communication devices to monitor their position and present their location via a local display.

These devices can connect to a variety of information and media sources such as the Internet, enabling users to watch movies, read and write text messages and emails, as well as engage in phone calls, at times concurrently. As the complexity of these applications increase, the complexity of the user interface increases commensurately. Mobile devices have been developed in a variety of configurations, with various display options. Convenience and ease of use continue to be objectives for improvement. The focus of the structural design of mobile phones continues to stress compactness of size, incorporating powerful processing functionality within smaller and slimmer phones.

The variety of available user application features requires a greater degree of user input for interactive functionality. It has become an increasingly greater challenge for the user to manage and control the use of displays, particularly when the mobile devices support numerous applications that need to be optimized for the particular display configurations. The traditional keypad input implementation may be sufficient to meet interactivity needs when only a single display is necessary.

However, as it becomes more desirable or necessary for the user to be able to view a plurality of display images simultaneously, there is an increasing need for a more robust and user friendly display management capability. Handheld devices are being provided with a plurality of displays that can be individually controlled to display images which may be independent of each other or may be interrelated. Applications that require simultaneous display of a plurality of images are not amenable to traditional keypad input if the keypad is obstructed from view.

A need thus exists for continued development of display management capability.

DISCLOSURE

The above described needs are fulfilled, at least in part, by providing a plurality of displays in a mobile communication device. A control module and one of the displays is contained by a first housing. Another housing, bearing a second display, is slidably engageable with the first housing. An optical data transmission mechanism is coupled between the control module and the second display. The optical data transmission mechanism may be laser based or infrared based. Data generated by the control module can be converted to optical signals and transmitted through the optical transmission path for control of the second display.

The optical data transmission mechanism includes an optical transmitter. Coupled to the control module, the transmitter may be fixed in position within the first housing. An optical receiver is fixed in position within the second housing. A prism is interposed in an optical transmission path between the optical transmitter and the optical receiver. The prism, fixed in position within the second housing, includes a portion that extends within a longitudinal track of the first housing. The length of the optical transmission path along the track varies in accordance with relative movement between the first and second housings. Both the first and the second displays are thus under control of the control module. One of the displays may serve as a user interactive input.

A cover member, in hinged engagement with the first housing, is moveable between open and closed states with respect to the housing member. A third display may be mounted on the cover member and coupled to the control module. In the closed state, the second housing is at a position that substantially overlaps the first housing, thereby hiding the first display. The device may be in an on-hook communication state at this time. In the open state, the device may be placed in an off-hook communication state. Both the second housing display and the third display may be viewed simultaneously by the user while the first display is hidden from view.

The second housing may be moved to an intermediate position in which the first display and third display are partially overlapped by the second housing. In such position, all three displays may be viewed by the user. The three displays may each display respective images simultaneously. The control module may be responsive to the movement of the second housing by the user to an intermediate position to control configuration of one of the displays as a touch screen input.

Additional advantages of the present disclosure will become readily apparent to those skilled in this art from the following detailed description, wherein only the preferred embodiment is shown and described, simply by way of illustration of the best mode contemplated. As will be realized, the disclosed concepts are capable of other and different embodiments, and the several details are capable of modifications in various obvious respects. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 1:
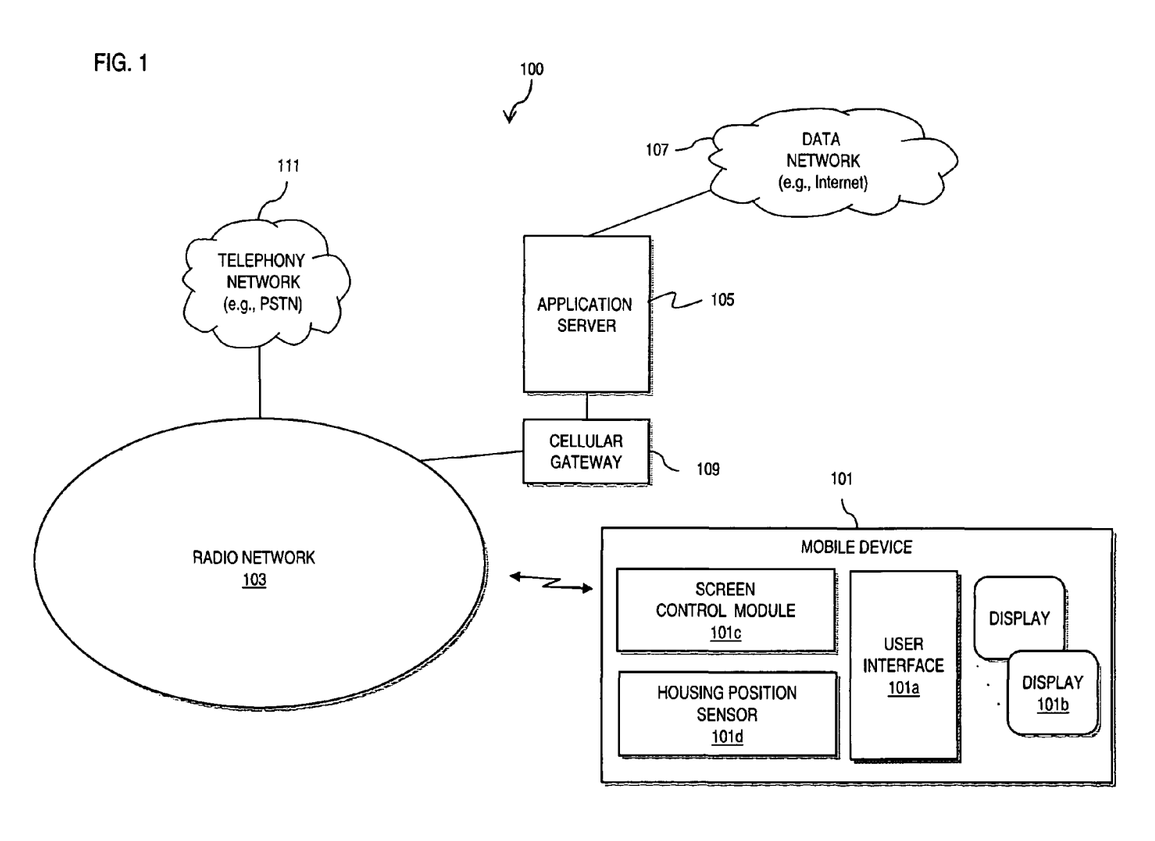
FIG. 1 is a diagram of system capable of managing multiple displays of a mobile device, according to an exemplary embodiment.

FIG. 1 is a diagram of a system capable of managing multiple displays of a mobile device, according to an exemplary embodiment. For the purposes of illustration, a mechanism for controlling displays based in part on movement of the device structure is described with respect to a communication system 100 that includes a mobile device 101 operating in a radio network 103, such as a cellular network. The mobile device 101 can include telephony capabilities for conducting voice communications. The mobile device 101 may comprise any type of electronic device, such as a cell phone, laptop, personal digital assistant (PDA), web appliance, etc. By way of example, the network 103 may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Components of the mobile device 101 can include a user interface 101a and one or more display units 101b. These display units 101b may be physically separate displays or virtually defined screens within one or more physical displays. In addition, the mobile device 101 includes a screen control module 101c for managing and controlling the displays 101b. A housing position sensor 101d operates in conjunction with the control module 101c for control of the images on the displays 101b. The housing position sensor 101d can detect the position to which a user manipulates a movable housing of the device. In accordance with the detected position, the screen control module 101c can access appropriate applications for control of the displays 101b.

Screen control module 101c can manage and control the device display(s) 101b according to, in certain applications, a manufacturer's predefined configuration or user defined configuration. The user may specify, as user preferences, the manner in which the displays 101b are controlled, and the parameters associated with the triggering mechanisms for updating the displays based on device movement. Such user preferences may also correlate the display (or screen) configurations with applications (e.g., browser, media player, etc.) and/or events—e.g., call, email or text message. Other events can include user defined events, software events, or keypress events.

Application server 105 can interact with the mobile device 101 to supply information by interfacing with a data network 107. The data communicated via data network 107 can be downloaded by the mobile device 101 via application server 105 and cellular gateway 109. Data network 107 may comprise any local area network (LAN), metropolitan area network (MAN), wide area network (WAN), the Internet, or any other suitable packet-switched network, such as a commercially owned, proprietary packet-switched network, e.g., a proprietary cable or fiber-optic network. Radio network 103 has connectivity to a telephony network 111, such as a Public Switched Telephone Network (PSTN), to allow the mobile device 101 to establish voice communications with terminals served by the telephony network 111.

Figure 2:
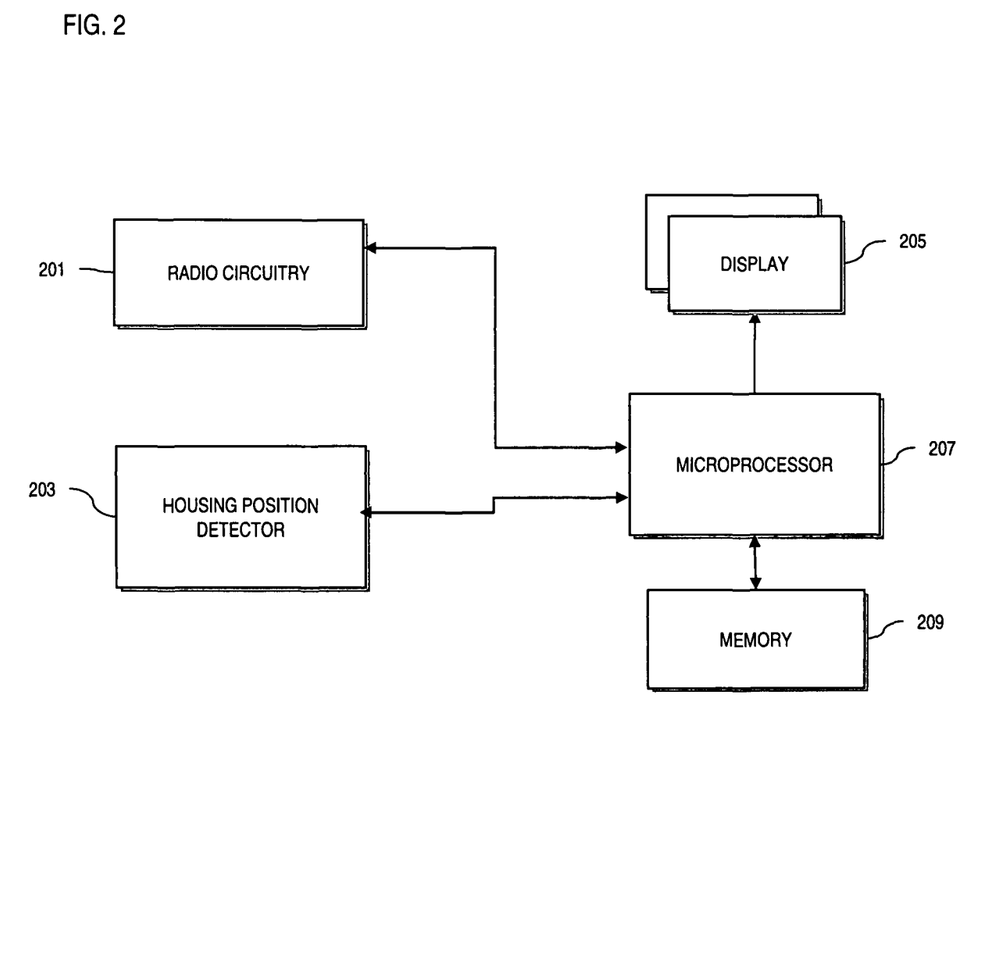
FIG. 2 is a block diagram of selected elements of the mobile device shown in FIG. 1.

FIG. 2 is a block diagram exemplifying elements of the mobile device shown in FIG. 1. Elements that are not necessary for description of operation are omitted for clarity of disclosure. The mobile device 101 includes radio circuitry 201, for communicating over the radio network 103, and housing position sensor 203. A plurality of displays 205 produce screen images under control of microprocessor 207 in accordance with input received from housing position sensor 203. Microprocessor 207 may be encompassed by the screen control module 101c, represented in FIG. 1. One or more of the displays 205 may be controlled to virtually simulate traditional user input devices, such as a keypad having alphanumeric and other keys, a cursor control, a trackball, or cursor direction keys, and the like. Direction information and command selections input by the user from a display when in an interactive touch screen mode can be communicated to the microprocessor 207. In response, the microprocessor can output commands for control of any of displays 205.

Microprocessor 207 can receive signal input from radio circuitry 210 and user signal input. Such signals are processed to generate data for updating displayed images. The microprocessor 207 can access memory 209 to support the display management process. Memory 209 may be comprised of random access memory (RAM) and other dynamic storage devices. Temporary variables or other intermediate information can be stored in memory during execution of instructions by the microprocessor 207. Such instructions can be read into memory 209 from another computer-readable storage medium (not shown). One or more processors in a multi-processing arrangement may also be employed to execute the instructions contained in memory 209.

Figure 3:
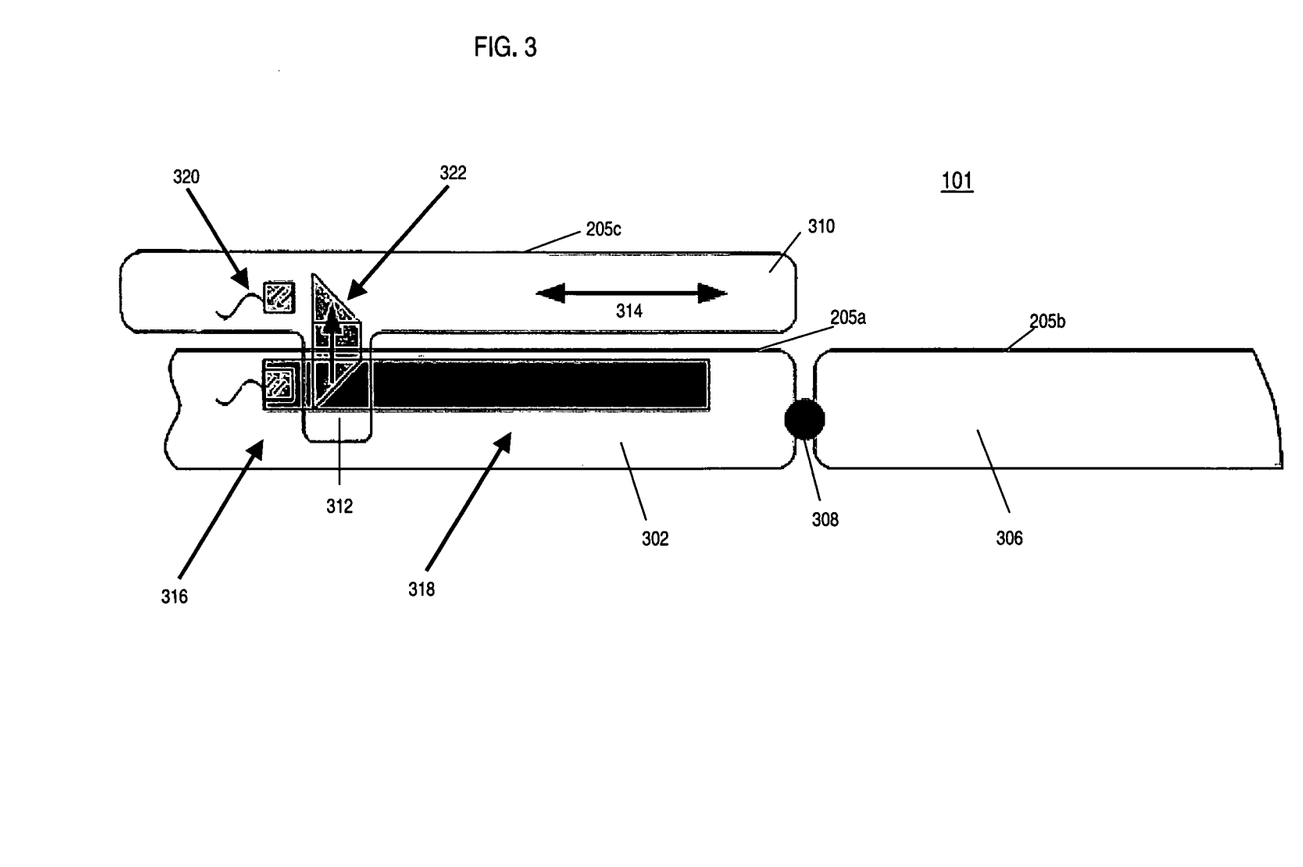
FIG. 3 is a side sectional view of a mobile device in a first physical configuration.

FIG. 3 is a sectional view of a mobile device 101 and is exemplary of concepts of the present disclosure. A first housing 302 contains a display 205a on its upper surface. The housing contains radio circuitry 201, housing position sensor 203, microprocessor 207, memory 209, represented in FIG. 2, as well as user interface 101a and screen control module 101c. Housing 306, which contains another display 205b on its upper surface, is coupled to housing 302 via hinged connection 308. The housings may be pivoted relative to each other about hinge 308 between an open position as shown and a closed position in which the lower surfaces of housings 302 and 306 are in substantial parallel contact. These positions correspond to known "flip phone" or "clam shell" operation in which the closed position effects an on-hook communication state and the open position effects an off-hook communication state. Electrical connection between elements of the housings 302 and 306 is made via hinge 308.

Housing 310 is mounted on housing 302. A lower surface of housing 310 is substantially parallel to and spaced above the upper surface of housing 302. A portion 312 of housing 310 extends downward from its lower surface for slidable engagement within a longitudinal track mechanism in housing 302. As indicated by the arrow 314, housing 310 can be moved by the user to set portion 312 to at least one other position in the longitudinal direction within the track mechanism in housing 302. In the position shown, housing 310 is in its leftmost position, substantially overlapping housing 302. In this position, display 205a is hidden from user view. Housing 310 contains display 205c on its upper surface. Display 205c is under control of the screen module 101c in housing 302. In the illustrated position of housing 310, the displays of both housings 306 and 310 may be controlled to generate screen images. As the display of housing 302 is not visible, the control module will deactivate that display.

Figure 4:
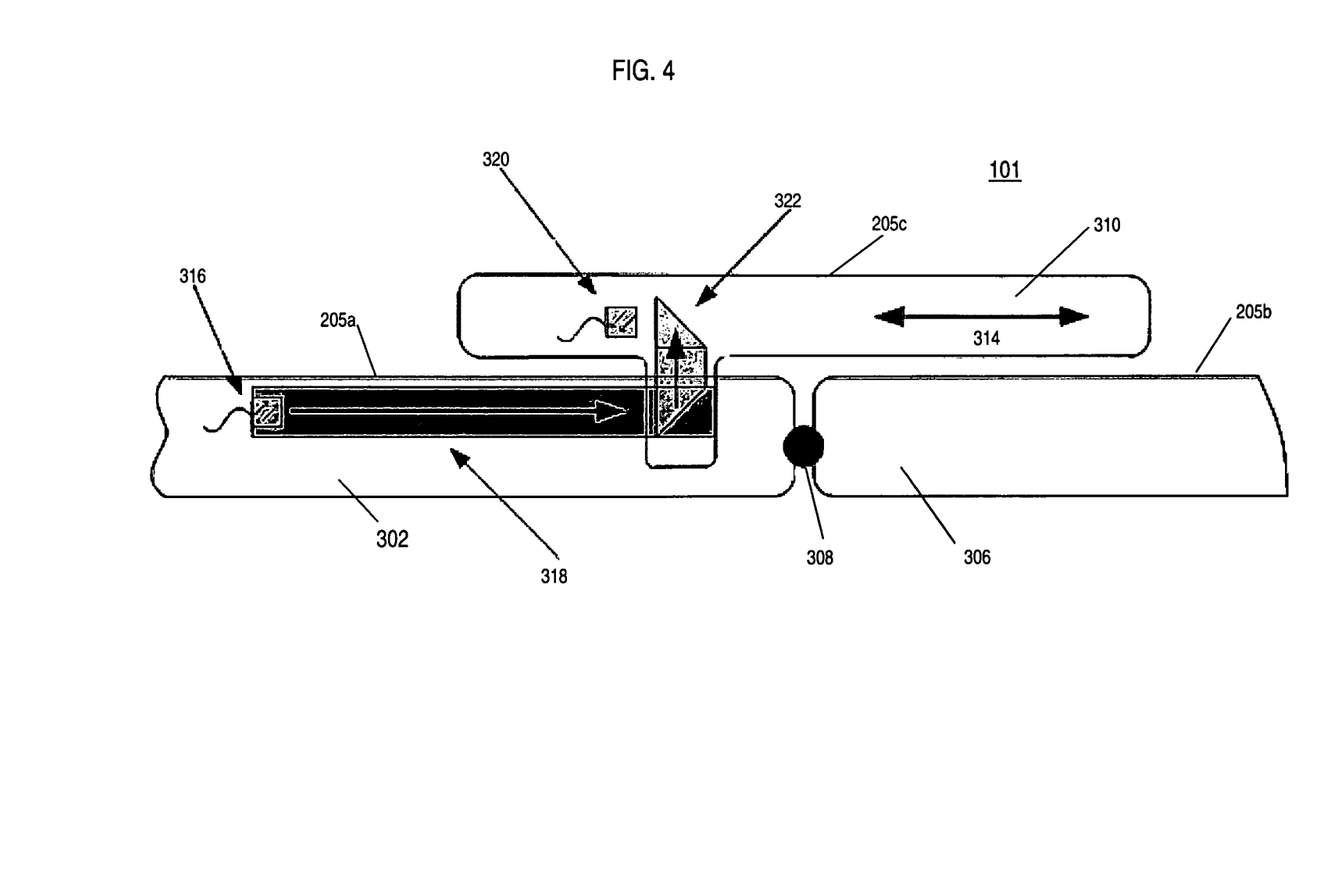
FIG. 4 is a side sectional view of a mobile device in a second physical configuration.

For applications that require additional display functionality, the user can slide housing 310 to the right, whereby the display of housing 302 is at least partially visible. FIG. 4 a side sectional view illustrating a position in which housing 310 partially overlaps both housings 302 and 306. The displays of each of the three housings may be controlled concurrently to provide the user with three screen images.

To meet the challenge of transferring data to the movable display 205c in housing 310, an optical data transmission mechanism is coupled between the control module in housing 302 and the housing 310. Optical transmitter 316 is fixed near one end of an optical transmission path 318 within the sliding track mechanism in housing 302. Optical receiver 320 is fixed within housing 310. An upper portion of prism 322 is fixed in housing 310 in optical communication with optical receiver 320. The prism extends downward within housing portion 312. The lower portion of prism 322 faces optical transmitter 316 along light path 318. As shown by the arrow, light generated by optical transmitter 316 is directed upward by the prism 322 and then redirected to optical receiver 320. Each of the housings 302 and 310 contains appropriate electro-optical conversion modules. Thus output data from the screen control module can be transmitted wirelessly to the display 205c. The optical data transmission mechanism avoids drawbacks that would occur from a wired connection between the two relatively movable objects. Housing 310 need only have connection to power and ground.

Figure 5:
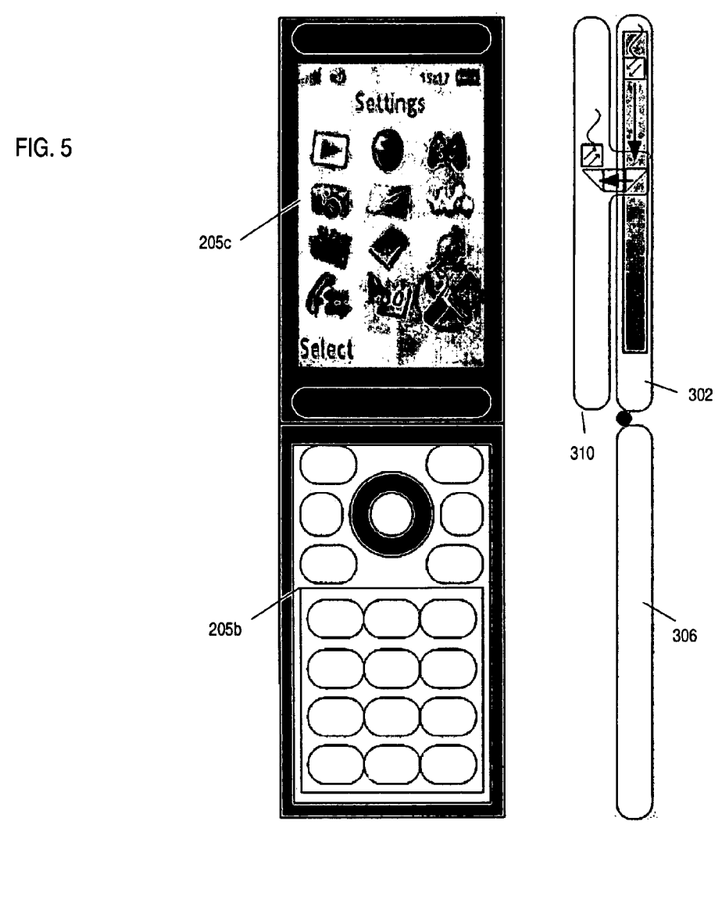
FIG. 5 is an illustration of a plan view and side view of the mobile device corresponding to that shown in FIG. 3.

FIG. 5 illustrates, in plan view, display functionality of the mobile device when the user has positioned housing 310 in overlapping relationship with housing 302, shown in FIG. 3. A side view, corresponding to FIG. 3 is shown adjacent the plan view. Only displays 205c and 205b are visible. The illustrated screens of displays 205c and 205b represent off-hook communication status of the device. The device may be set to a default communication mode when the "clam shell" is opened from the closed position. The display 205c is controlled to generate typical menu settings and selections images attendant to phone operation. The display 205b is controlled as an interactive touch screen to simulate traditional user input devices, such as a keypad having alphanumeric and other keys, a cursor control, and cursor direction keys. In response to user input from the touch screen of display 205b, the control module generates command data to perform the user's selected function and to produce a new image on display 205c, if appropriate.

The display 205c screen shown in FIG. 5 simulates a default screen generated during operation of a communication application. The user may change a default setting by appropriate manipulation of the touch screen 205b. For example, display 205c, may be set by default to generate picture or the like. Display 205c screen may be changed to a communication image screen in response to an incoming transmission or by user input indicative of an outgoing call requirement. Display 205c may be controlled to display text or video data received during an incoming communication or to change images in response to user interactivity with the touch screen of display 205b.

Figure 6:
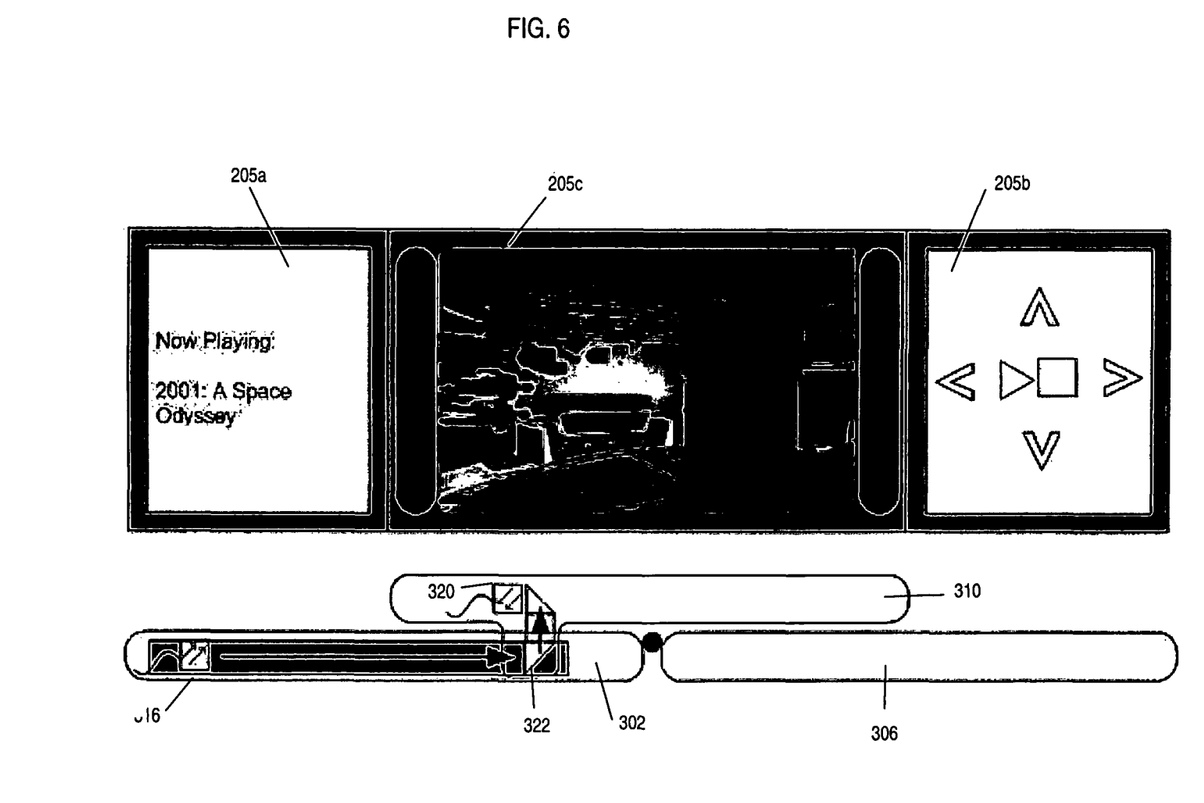
FIG. 6 is an illustration of a plan view and side view of the mobile device corresponding to that shown in FIG. 4.

FIG. 6 illustrates, in plan view, display functionality of the mobile device when the user has moved housing 310 to the right to a position that partially overlaps both housings 302 and 306, corresponding to FIG. 4. A side view, is shown adjacent the plan view. In this configuration, the three display screens are controlled concurrently to generate respective images. The three display screens may generate different images, greatly enhancing the functionality of various applications. The application illustrated in the drawing figure generates a video presentation, exemplified as movie content. The displays 205a-205c are controlled to simulate a video player. Display screen 205c simulates a movie screen, as shown. Display screen 205a generates text images. Display screen 205b is controlled as a user interactive touch screen.

In the illustrated application, text screen 205a may be controlled initially to present a menu display function. The user may select an option displayed in screen 205a by touching an icon in screen 205b. The image of screen 205b at this time may simulate a keypad portion of a remote controller. Interaction ultimately results in a selected program content. Displays 205a-205c are controlled to generate images appropriate to the presentation phase of the application. FIG. 6 illustrates the text screen 205a image identifying the movie content. The touch screen image generated on screen 205b has now been changed to simulate typical play options (play, fast forward, reverse, pause, etc.).

The video presentation application illustrated in FIG. 6 is but one of many user interactive applications that can be implemented with enhanced benefit of the three display control capability. The screens need not be dedicated to particular display content. For example each of the screens can be controlled to display a graphic image, text image, still picture image, video image, etc. A plurality of the displays may be controlled to present a combined panoramic view or a continuous text. The touch screen 205b may be controlled to display a picture image with overlying icons for touch interactivity.

In this disclosure there are shown and described only preferred embodiments of the disclosure and but a few examples of its versatility. It is to be understood that the disclosure is capable of use in various other combinations and environments and is capable of changes or modifications within the scope of the concepts expressed herein.

What is claimed is:

1. A mobile communication device comprising:
   a first housing having an upper surface and a longitudinal track disposed within the upper surface;
   a second housing mounted on the first housing,
      wherein a lower surface of the second housing is substantially parallel to, and spaced above, the upper surface of the first housing, and
      wherein a portion of the second housing extends downward from the lower surface for slidable engagement within the longitudinal track in the upper surface of the first housing;
   an optical transmission path located within the longitudinal track in the first housing;
   an optical transmitter fixed in position within the first housing near an end of the optical transmission path;
   a prism having an upper portion and a lower portion, wherein the upper portion is fixed in the second housing, wherein the prism extends downward within the portion of the second housing such that the lower portion of the prism extends within the longitudinal track and faces the optical transmitter along the optical transmission path in the first housing, and wherein the prism is configured to move linearly along the longitudinal track in conjunction with the slidable engagement of the portion of the second housing within the longitudinal track; and
   an optical receiver fixed in position within the second housing, wherein the optical receiver faces the upper portion of the prism.

2. The mobile communication device of claim 1, further comprising:
   a control module contained in the first housing;
   a first display mounted on the first housing; and
   a second display mounted on the second housing.

3. The mobile communication device of 2, wherein the first and second displays are coupled to each other in an overlapping relationship.

4. The mobile communication device of claim 2, further comprising:
   a cover member in hinged engagement with the first housing, the cover member moveable to open and closed states with respect to the first housing; and
   a third display mounted on the cover member and coupled to the control module.

5. The mobile communication device of claim 4, wherein the second housing is configured, when the cover is in the open state, to be locatable at an intermediate position that partially overlaps the first and third displays.

6. The mobile communication device of claim 5, wherein each of the first, second and third displays is configured to display respective images with the second housing located at the intermediate position.

7. The mobile communication device of claim 4, wherein one of the displays is configured to be interactive with the user.

8. The mobile communication device of claim 7, wherein the control module is responsive to the position of the second housing to control user interactivity with one of the first, second or third displays.

9. The mobile communication device of claim 1, wherein the optical transmission path has a length along the longitudinal track that varies with relative movement between the first and second housings.

10. The mobile communication device of claim 1, wherein the prism has a trapezoidal cross-section.

11. A device comprising:
   a first housing having a longitudinal track, wherein the longitudinal track includes an optical transmission path;
   a second housing mounted on the first housing;
   an optical transmitter fixed in position within the first housing near an end of the optical transmission path;
   an optical receiver fixed in position within the second housing; and
   a prism having a first portion and a second portion, wherein the first portion is fixed in the second housing such that the first portion faces the optical receiver, wherein the second portion extends into the longitudinal track of the first housing such that the second portion faces the optical transmitter along the optical transmission path in the first housing,
   wherein a portion of the second housing extends downward from a lower surface of the second housing for slidable engagement within the longitudinal track in the first housing, and wherein the prism extends into the longitudinal track within the portion of the second housing such that the prism is configured to move linearly along the longitudinal track in conjunction with the slidable engagement of the portion of the second housing within the longitudinal track.

12. The device of claim 11, wherein the lower surface of the second housing is substantially parallel to, and spaced above, an upper surface of the first housing.

13. The device of claim 11, wherein the second housing is movable within the longitudinal track of the first housing such that the second housing is movable to multiple different positions relative to the first housing.

14. The device of claim 11, wherein the optical transmitter transmits optical data from the first housing to the optical receiver in the second housing via the prism.

15. The device of claim 11, wherein the device comprises a mobile communication device.

16. The device of claim 12, wherein the longitudinal track extends within a substantial length of the upper surface of the first housing.

17. The device of claim 11, wherein the prism has a trapezoidal cross-section.

18. The device of claim 13, wherein, when the second housing is moved within the longitudinal track of the first housing to the multiple different positions relative to the first housing, the second portion of the prism correspondingly moves to multiple different positions within the optical transmission path.

* * * * *